United States Patent [19]

Brizgys et al.

[11] 4,256,848
[45] Mar. 17, 1981

[54] SYNERGISTIC POLYURETHANE CO-CATALYSTS WHICH ARE A COMBINATION OF AN ORGANO-MERCURIC COMPOUND AND A ZINC SALT OF AN ALKYL CARBOXYLIC ACID

[75] Inventors: Bernardas Brizgys, Southgate; James A. Gallagher, Grosse Ile, both of Mich.

[73] Assignee: BASF Wyandotte Corporation, Wyandotte, Mich.

[21] Appl. No.: 84,945

[22] Filed: Oct. 15, 1979

Related U.S. Application Data

[63] Continuation-in-part of Ser. No. 883,376, Mar. 8, 1978, abandoned.

[51] Int. Cl.$^3$ ............................................. C08G 18/14
[52] U.S. Cl. ...................................... 521/124; 528/55
[58] Field of Search ........................... 521/124; 528/55

[56] References Cited

U.S. PATENT DOCUMENTS

| | | | |
|---|---|---|---|
| 2,374,136 | 4/1945 | Rothrock | 521/124 |
| 3,347,804 | 10/1967 | Buckley | 521/124 |
| 3,419,509 | 12/1968 | Willett | 521/124 |
| 3,583,945 | 6/1971 | Robins | 521/124 |
| 3,642,044 | 2/1972 | Fertig et al. | 528/55 |
| 3,927,053 | 12/1975 | Gallagher et al. | 521/124 |

FOREIGN PATENT DOCUMENTS 980139  1/1965  United Kingdom .

OTHER PUBLICATIONS

Mohiuddin et al., *Elastomerics*, Apr., 1977, pp. 41–45.

*Primary Examiner*—Maurice J. Welsh
*Attorney, Agent, or Firm*—Andrew E. Pierce

[57] ABSTRACT

The reaction of an organic polyisocyanate with an organic compound containing at least 2 active hydrogen containing groups is catalyzed with a synergistic co-catalyst combination of at least one organo-mercuric catalyst and at least one zinc salt of an alkylcarboxylic acid having about 2 to about 22 carbon atoms. Useful solid (non-cellular) and foamed polyurethane products are obtained which are produced at a faster curing rate than with use of either co-catalyst alone.

22 Claims, No Drawings

SYNERGISTIC POLYURETHANE CO-CATALYSTS WHICH ARE A COMBINATION OF AN ORGANO-MERCURIC COMPOUND AND A ZINC SALT OF AN ALKYL CARBOXYLIC ACID

CROSS-REFERENCE TO RELATED APPLICATION

This is a continuation-in-part of application Ser. No. 883,376, filed Mar. 8, 1978 and now abandoned.

BACKGROUND OF THE INVENTION

1. Field of the Invention

This invention relates to the preparation of polyurethanes including solid, non-cellular, and foamed urethanes, both rigid and flexible. In another aspect, the invention relates to a novel catalyst system for the preparation of polyurethanes which system exhibits a faster cure rate at ambient temperature than shown by either component of the catalyst combination when utilized separately.

2. Description of the Prior Art

Cellular polyurethane foams are usually prepared by the reaction between a compound containing at least 2 reactive hydrogen atoms as determined by the well-known Zerewitinoff method as described by Kohler in *Journal of the American Chemical Society*, 49,3181 (1927) and a polyisocyanate. In producing the foam, there are generally introduced various additives for blowing the polyurethane or emulsifying the urethane being formed and catalysts are utilized to promote the reaction within desirable time limits. Generally tertiary amine catalysts are used in combination with an organo-metallic compound such as stannous octoate or stannous oleate to promote the cross-linking reaction. In preparing such foams, the properties obtained are often dependent upon the water sensitivity in the typical polyisocyanate-polyol reactant mixture. The polyisocyanatewater reaction leads to the formation of carbon dioxide and thus more or less gas is generated depending on the presence of more or less water being present even in small amounts. It is also known to utilize as catalysts for the reaction certain mercuric salts of carboxylic acids, for instance, phenylmercuric acetate. These compounds as catalysts for the polyisocyanate-polyol reaction avoid to a substantial degree variations in foam properties as a result of the presence of moisture.

In the preparation of cross-linked, solid, non-cellular polyurethane polymers whether rigid or elastomeric, liquid mixtures of organic polyisocyanates and hydroxyterminated polyols have been reacted in the presence of certain mercury compounds as disclosed in U.S. Pat. No. 3,583,945 and U.S. Pat. No. 3,592,787, at ambient conditions of temperature without the use of heat or pressure. It is also known to catalyze the reaction of isocyanates with organic compounds utilizing metallic driers as catalysts in accordance with the teaching of U.S. Pat. No. 2,374,136. Thus cobalt naphthenate, manganese naphthenate, lead naphthenate and other metallic driers are known to catalyze the reaction. While other organo-metallic compounds such as stannous octoate or lead naphthenate are known to function as catalysts for the preparation of polyurethane foams, it is also known that zinc salts (carboxylates) are very poor catalysts for this reaction as disclosed in U.S. Pat. No. 3,347,804. Even combining 10% tin octoate with 90% zinc naphthenate provided a catalyst combination which showed an extremely slow foam rise time which was too slow to have commercial utility.

It is therefore particularly surprising that the applicants have discovered that the combination of an organo-mercuric compound with a zinc salt of an aliphatic carboxylic acid is an efficient co-catalyst which provides a means of accelerating the rate of cure at ambient temperatures for the reaction of an organic polyisocyanate and a compound containing at least 2 reactive hydrogen atoms, which catalyst combination is more effective than the use of the organo-mercuric compound when used alone as a catalyst.

SUMMARY OF THE INVENTION

It is the primary object of this invention to provide an improved co-catalyst combination for use in the production of polyurethanes said co-catalyst being capable of promoting a faster cure rate at ambient temperatures as compared to the use of an organo-mercuric compound. Both solid and cellular polyurethanes can be produced using the co-catalysts of the invention by the reaction of an organic polyisocyanate and a compound containing at least 2 reactive hydrogen atoms as determined by the Zerewitinoff method. The faster cure rate is achieved by combining an organo-mercuric compound with a zinc salt of an aliphatic carboxylic acid having about 2 to about 22 carbon atoms in the chain. It is particularly surprising that an improved cure rate can be obtained with this catalyst combination since it is well known to those skilled in the art that zinc salts of carboxylic acids when used alone are relatively poor catalysts for the polyisocyanate-hydroxyl reaction which takes place in the production of solid and cellular polyurethanes. Thus the applicants have discovered a catalyst combination which is more efficient in promoting the polyisocyanate-hydroxyl reaction and the use of which can result in the use of reduced amounts of an organo-mercuric catalyst to obtain similar reaction speeds. The process of the invention thus offers the advantage of reduced utilization of organo-mercuric catalysts, which are believed to be harmful when present in the environment.

DETAILED DESCRIPTION OF THE INVENTION AND THE PREFERRED EMBODIMENTS

It has now been found in accordance with the present invention that a combination of certain organo-mercuric compounds with a zinc salt of an aliphatic carboxylic acid having about 2 to about 22 carbon atoms in the chain will effectively promote a rapid catalysis of the reaction of an organic polyisocyanate with an organic compound containing at least 2 reactive hydrogen atoms such as a polyhydroxy-terminated polyol. Because it is known in the prior art that zinc alkyl carboxylates are very poor catalysts for acceleration of the polyisocyanate-hydroxyl reaction, it is particularly surprising that the use of zinc salts of the above carboxylic acids when combined with organo-mercuric compounds would increase the activity of the organo-mercuric catalyst such that a faster cure rate is obtained in the preparation of polyurethanes.

The organo-mercuric compounds useful in the invention comprise (1) the divalent mono-mercuric salts of organic acids and (2) the ionizable mono-organo-mercuric carboxylates and polycarboxylates containing only one carbon to mercury bond which are inert to isocyanate-active hydrogen reactions. Examples of the first group of compounds are the mono-mercuric salts of aliphatic carboxylic acids having about 2 to about 22 carbon atoms in the chain. Representative examples are mercuric octoate, mercuric acetate, and mercuric stearate. The mercuric salts of aromatic carboxylic acids are also useful. Examples are mercuric benzoate, mercuric phthalate, and mercuric salicylate. The ionizable mono-organo-mercuric compounds are generally more effective than the divalent mercury compounds described above and therefore can be used in smaller quantities. However, an important reason for preferring this group of mercuric compound catalysts is that it has been found that the organic polyisocyanate-hydroxyl reaction can be effectively catalyzed while the usually disadvantageous side reaction (in polyurethane coatings) of the organic polyisocyanate with water is inhibited when utilizing this catalyst.

Representative of this group of ionizable organo-mercuric carboxylate and polycarboxylate catalysts are the organo-mercuric acetate, propionate, benzoate, methacrylate, hydroxide, phthalate, gluconate, salicylate, octoate, stearate, etc. The organo substituent can be an open or closed chain organic radical which is inert to isocyanate-active hydrogen reactions such as an aryl or alkyl group, i.e., phenyl or methyl. Another group of organo-mercuric compounds which are useful in the co-catalyst combination of the invention are prepared by the reaction of a substituted mercury salt with a mono- or dicarboxylic acid or anhydride in accordance with the process disclosed in U.S. Pat. No. 2,692,204, incorporated herein by reference. Representative substituted mercury salts which can be reacted with a mono- or dicarboxylic acid or anhydride in preparing the organo-mercury catalysts of the invention are phenyl mercury hydroxide, benzyl mercury hydroxide, naphthyl mercury hydroxide, and cyclohexyl mercury hydroxide. Representative mono- and dicarboxylic acids and anhydrides which can be employed in the preparation of the organo-mercury compounds utilized as catalysts in the invention include aliphatic monocarboxylic acids and anhydrides, such as acetic, propionic, butyric, valeric, heptanoic, octanoic, 2-methylhexanoic, hexanoic, nonanoic, decanoic, dodecanoic, octadecanoic, and their anhydrides and substituted saturated and unsaturated aliphatic dicarboxylic acids such as dodecenyl succinic, octenyl succinic, decenyl glutaric, octyladipic and octodecyl malonic acids and anhydrides.

Representative useful organo-mercury catalyst compositions include tertiary butyl mercury decanoate, phenyl mercury acetate, phenyl mercury 2,2-dimethylhexanoate, phenyl mercury decanoate, phenyl mercury dodecanoate, toluyl mercury dodecanoate, tolyl mercury octanoate, bis(phenyl mercury) dodecenyl succinate, bis(phenyl mercury) decenyl succinate, bis(tolyl mercury) dodecenyl succinate, bis-(tertiary butyl mercury) dodecenyl succinate and mixtures thereof.

Zinc salts of alkyl carboxylic acids having about 2 to about 22 carbon atoms in the chain are known to those skilled in the art. The zinc salts of alkyl carboxylic acids are preferably zinc naphthenate, neodecanoate, and tallate but zinc isooctoate, oleate and other alkyl carboxylic acid derived, substituted or unsubstituted anions such as those derived from lauric acid, stearic acid, acetic acid, indolacetic acid, phenylacetic acid, chlorophenylacetic acid, etc., are useful forms of the zinc salts of the invention.

The zinc salts of the invention are generally utilized in a weight ratio to provide about 0.005 part to about 0.5 part zinc cation per 100 parts by weight of said organic compound having at least 2 active hydrogen-containing groups. Preferably, about 0.01 part to about 0.2 part is used and most preferably about 0.05 part to about 0.1 part is used. The mercury cation of the organo-mercuric compound is generally present in proportion to the zinc cation of the zinc salts of the invention in the weight ratio of about 10:1 to about 1:2. Preferably the mercury cation to zinc cation ratios are 8:1 to about 1:1.5, and most preferably said ratios are about 5:1 to about 1:1.

The polyurethanes prepared by the process of the present invention generally comprise the reaction product of an organic polyisocyanate and an organic polyol. If it is desired to prepare a polyurethane coating, then in addition to the above-mentioned materials, generally a filler and a pigment as well as a curing agent can be employed. If it is desired to prepare a polyurethane foam, then in addition to said polyisocyanate and polyol, a blowing agent and a stabilizer are generally employed. Alternatively, instead of using a blowing agent, a tertiary amine catalyst can be utilized to promote the water-isocyanate reaction to produce carbon dioxide as a blowing agent. It is to be understood that the particular adjuncts employed in the preparation of polyurethane reaction products are well known in the art and their use varies according to the products desired. The ratio of isocyanate groups to hydroxyl groups in the solid and foamed polyurethanes produced using the co-catalysts of the invention is generally 0.9:1.0 to about 1.5:1.0, preferably about 1.05:1.0 to about 1.2:1.0, and most preferably about 1.05:1.0 or, approximately a stoichiometric amount of each of said reactants.

Illustrative organic polyisocyanates which can be employed in accordance with the present invention include aromatic, aliphatic, and cycloaliphatic polyisocyanates and combinations thereof. Representative of these types are the diisocyanates such as m-phenylene diisocyanate, tolylene-2, 4-diisocyanate, tolylene-2,6-diisocyanate, mixtures of 2,4- and 2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, and 3,3'-dimethyldiphenylmethane-4,4'-diisocyanate; the triisocyanates such as 4,4',4"-triphenylmethane triisocyanate, polymethylene polyphenylisocyanate, and tolylene 2,4,6-triisocyanate; and the tetraisocyanates such as 4,4'-dimethyldiphenylmethane 2,2',5,5'-tetraisocyanate. Especially useful because of their availability and properties are tolylene diisocyanate, diphenylmethane-4,4'-diisocyanate, and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,215,652, incorporated herein by reference.

As used in the present invention, the terms "organic polyisocyanate" also include isocyanate-terminated polyurethane prepolymers which are prepared by the reaction of an excess amount of any of the above-mentioned organic polyisocyanates with an organic polyol. Any of the organic polyols discussed below can be used.

Representative of the organic polyols which can be employed alone or in admixture in accordance with the present invention are those polyols having at least two active hydrogen atoms. The term "active hydrogen atoms" refers to hydrogen atoms which, because of their position in the molecule, display activity according to the Zerewitinoff test as described by Kohler in *J. Am. Chem. Soc.*, 49, 3181 (1927). Representative organic polyols include polyhydroxyl-containing polyesters, polyalkylene polyether polyols, polyhydroxy-terminated polyurethane polymers, polyhydroxyl-containing phosphorus compounds, aliphatic polyols, and alkylene oxide adducts of polyhydric polythioethers, polyacetals, aliphatic thiols, ammonia, and amines including aromatic, aliphatic, and heterocyclic amines, as well as mixtures thereof. Alkylene oxide adducts of compounds which contain two or more different groups within the above-defined classes can also be used such as amino alcohols which contain an amino group and a hydroxyl group. Also alkylene oxide adducts of compounds which contain one —SH group and one —OH group as well as those which contain an amino group and a —SH group can be used.

Any suitable hydroxyl-containing polyester can be used such as are obtained from polycarboxylic acids and polyhydric alcohols. Any suitable polycarboxylic acid can be used to prepare said polyester such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethyl-succinic acid, isophthalic acid, terephthalic acid, hemimellitic acid, and 1,4-cyclohexane-dicarboxylic acid.

Any suitable polyhydric alcohol including both aliphatic and aromatic can be used to prepare said polyester such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenol such as 2,2-bis(4,4'-hydroxyphenyl)propane, commonly known as Bisphenol A.

Any suitable polyalkylene polyether polyol can be used such as the polymerization product of an alkylene oxide or of an alkylene oxide with a polyhydric alcohol. Any suitable polyhydric alcohol can be used such as those disclosed above for use in the preparation of the hydroxyl-containing polyesters (polyester polyols). Any suitable alkylene oxide can be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols can have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols can be prepared by any known process such as, for example, the process disclosed by Wurtz in 1859 and *Encyclopedia of Chemical Technology*, vol. 7, pp. 257-262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-bis(4,4'-hydroxyphenyl)propane and blends thereof having equivalent weights of from 250 to 5000.

Suitable polyhydric polythioethers which can be condensed with alkylene oxides include the condensation product of thiodiglycol or the reaction product of a dihydric alcohol such as disclosed above for the preparation of the hydroxyl-containing polyesters with any other suitable thioether glycol.

The hydroxyl-containing polyester can also be a polyester amide such as obtained by including some amine or amino alcohol in the reactants for the preparation of the polyesters. Thus, polyester amides can be obtained by condensing an amino alcohol such as ethanolamine with the polycarboxylic acids set forth above or they can be made using the same components that make up the hydroxy-containing polyester with only a portion of the components being a diamine such as ethylene diamine.

Suitable polyacetals which can be condensed with alkylene oxides include the reaction product of formaldehyde or other suitable aldehyde with a dihydric alcohol or an alkylene oxide such as those disclosed above.

Suitable aliphatic thiols which can be condensed with alkylene oxides include alkane thiols containing at least two -SH groups such as 1,2-ethane dithiol, 1,2-propane dithiol, 1,3-propane dithiol, and 1,6-hexane dithiol; alkene thiols such as 2-butene-1,4-dithiol; and alkyne thiols such as 3-hexyne-1,6-dithiol.

Other compounds which do not necessarily fit within any of the previously set forth classes of compounds which are quite suitable in the production of isocyanate-terminated prepolymers include the hydroxy-terminated polyurethane prepolymers such as a hydroxy-terminated prepolymer made by reacting an isocyanate with several moles of an alkylene glycol. The above-described polyols used in the invention can be used alone or in mixtures.

The following examples illustrate the various aspects of the invention but are not intended to limit it. When not otherwise specified throughout the specification and claims, temperatures are given in degrees centigrade, and parts, percentages, and proportions are by weight.

EXAMPLE 1

(Comparative example forming no part of this invention)

A polyurethane sealant was prepared in the following manner:

(A) To a container there was charged 545 parts by weight of a 2000 molecular weight diol based upon propylene oxide and propylene glycol, 253 parts by weight of a calcined clay sold under the trademark "SATINTONE NO. 2", and 4 parts by weight of yellow iron oxide together with 1.2 parts by weight of a phenyl mercury carboxylate containing 45% mercury sold under the trademark "COSAN 27". These materials were thoroughly mixed using a high shear laboratory mixer.

(B) In a second container there was added 25.3 parts by weight of an aromatic polyisocyanate prepared by mixing crude methylene diisocyanate and a toluene diisocyanate quasi-prepolymer believed to be prepared by mixing 20 to 30% by weight of a crude diphenyl methane 4,4′-diisocyanate with 80 to 70% by weight of a toluene diisocyanate quasi-prepolymer having 23–27% by weight free isocyanate and sold under the trademark "MONDUR E-425". There was then added 200 parts by weight of the mixture prepared in paragraph (A) and, after thoroughly mixing the ingredients, the viscosity was measured starting every two to three minutes using a Brookfield RVT viscometer. The initial temperature of the mixture was approximately 25° centigrade. The gel time, or the time to reach a viscosity of 200,000 centipoise, was found to be 47 minutes. The same formulation prepared after part (A) was allowed to age three weeks at room temperature prior to combining with said quasi-prepolymer mixture showed a gel time of 51 minutes.

EXAMPLE 2

A second polyurethane sealant was prepared in accordance with the procedure of Example 1 except that in addition to the phenyl mercury carboxylate utilized in part (A) there was added 2.5 parts by weight of zinc neodecanoate containing 16% by weight of the metal. Upon combining part (A) with the quasi-prepolymer utilized in Example 1, it was found that the gel time of the formulation when first prepared was 31 minutes and when part (A) was stored three weeks at room temperature prior to combining with said quasi-prepolymer, the gel time was 23 minutes.

EXAMPLE 3

(Comparative example forming no part of this invention)

A polyurethane sealant was prepared in accordance with the procedure and proportions of Example 1 except that the phenyl mercury carboxylate catalyst contained in part (A) was replaced by 2.5 parts by weight of zinc neodecanoate (16% by weight zinc). When part (A) was combined with said quasi-prepolymer, and an attempt was made to measure the gel time, it was found that the sealant formulation does not cure at room temperature and thus no gel time could be measured even after 16 hours at room temperature.

EXAMPLE 4

(Comparative Example)

A polyurethane sealant was prepared in the following manner:

(A) To a flask there was charged 480 parts by weight of a 2000 molecular weight diol based upon propylene oxide and propylene glycol, 64 parts by weight of a 3000 molecular weight triol based upon propylene oxide and trimethylol propane, 8 parts by weight of iron oxide, 50.6 parts by weight of a finely-divided silica sold under the trademark "IMSIL A-25", and 194.4 parts by weight of a calcined clay sold under the trademark "SATINTONE No. 2". To this composition there was added as a catalyst, 1.2 parts by weight of a phenyl mercury carboxylate containing 45% mercury sold under the trademark "COSAN 27". These materials were mixed thoroughly in accordance with the procedure of Example 1.

(B) To 23 parts by weight of the aromatic polyisocyanate quasi-prepolymer utilized in Example 1 which is sold under the trademark "MONDUR E-425" there was added 200 parts of the polyol-pigment-catalyst mixture prepared in paragraph (A). After thorough mixing, the gel time was determined as in Example 1 and found to be 93 minutes.

EXAMPLE 5

Example 4 was repeated except that there was added in combination with the phenyl mercury carboxylate catalyst one part by weight of zinc neodecanoate containing 16% by weight of the metal. Upon combining 200 parts by weight of part (A) with 23 parts by weight of the quasi-prepolymer ("MONDUR E-425") utilized in Example 4, it was found that the gel time was 40 minutes.

EXAMPLE 6

(Comparative example forming no part of this invention)

Example 4 was repeated except that the gel time was measured starting at an initial temperature of 100° F. and found to be 28 minutes.

EXAMPLE 7

Example 5 was repeated except that instead of one part by weight of zinc neodecanoate 1.25 parts by weight were used. Evaluation of the gel time starting the mix at a temperature of 100° F. resulted in a gel time of 11 minutes.

What is claimed is:

1. In a process of forming a polyurethane by reacting an organic polyisocyanate with an organic compound containing at least 2 active hydrogen-containing groups as determined by the Zerewitinoff method, the improvement comprising employing a catalyst consisting of a synergistic combination of at least one organo-mercuric compound and at least one zinc salt of an alkyl carboxylic acid having about 2 to about 22 carbon atoms wherein the organo-mercuric compound is selected from the group consisting of (1) the divalent mono-mercury salts of organic acids and (2) the ionizable mono-organo-mono-mercuric carboxylates or polycarboxylates containing only one carbon to mercury bond which are inert to isocyanate-active hydrogen reactions.

2. The process of claim 1 wherein said organo-mercuric compound is a mercuric carboxylate and said zinc salt is selected from the group consisting of zinc naphthenate, zinc tallate, zinc neodecanoate, and mixtures thereof.

3. The process of claim 2 wherein said organo-mercuric compound is a phenylmercuric salt of an alkyl carboxylic acid.

4. The process of claim 3 wherein said phenylmercuric salt is a salt of an alkyl carboxylic acid having a chain length of about 2 to about 22 carbon atoms.

5. The process of claim 4 wherein said phenylmercuric salt and said zinc salt are present in amounts to contribute:

(A) from about 0.005 part by weight to about 0.5 part by weight zinc cation per 100 parts of said organic compound containing at least 2 active hydrogen-containing groups, and (B) an alkyl phenylmercuric salt of a carboxylic acid is present in a weight ratio of about 10:1 to about 1:2 of mercury cation to the zinc cation respectively.

6. The process of claim 5 wherein said process comprises reacting an aromatic polyisocyanate and a polyalkylene polyol in a liquid reaction mixture.

7. The process of claim 6 wherein said polyol is a polyalkylene polyether polyol selected from the group consisting of at least one of a propylene oxide-propylene glycol diol and a propylene oxide-trimethylolpropane triol and said process is conducted in the presence of a catalytic amount of a phenylmercuric alkyl carboxylate and zinc neodecanoate.

8. The process of claim 7 wherein said polyisocyanate and polyol are used in proportions to provide isocyanate and hydroxyl groups which are present in approximately stoichiometric amounts.

9. A solid, non-cellular polyurethane which is the product of the process of claim 1.

10. A foamed polyurethane which is the product of the process of claim 1.

11. A curable mixture consisting of 2 components, A and B, utilized in the preparation of a polyurethane, wherein component A consists of an organic compound containing at least 2 active hydrogen-containing groups as determined by the Zerewitinoff method and a co-catalyst mixture of at least one organo-mercuric compound and at least one zinc salt of an alkyl carboxylic acid having about 2 to about 22 carbon atoms and wherein component B consists of an organic polyisocyanate wherein the organo-mercuric compound is selected from the group consisting of (1) the divalent mono-mercury salts of organic acids and (2) the ionizable mono-organo-mono-mercuric carboxylates or polycarboxylates containing only one carbon to mercury bond which are inert to isocyanate-active hydrogen reactions.

12. The composition of claim 11 wherein said organo-mercuric compound is a mercuric alkyl carboxylate wherein said carboxylate has a chain length of about 2 to about 22 carbon atoms.

13. The composition of claim 12 wherein said mercuric alkyl carboxylate is a phenylmercuric salt of an alkyl carboxylic acid.

14. The composition of claim 13 wherein said zinc salt of an alkyl carboxylic acid is selected from the group consisting of zinc neodecanoate, zinc naphthenate, zinc tallate, and mixtures thereof.

15. The composition of claim 14 wherein said organic polyisocyanate is an aromatic polyisocyanate, said organic compound containing at least 2 active hydrogen-containing groups is a polyalkylene polyol, and said zinc salt is zinc neodecanoate.

16. The composition of claim 15 wherein said polyol if a polyalkylene polyether polyol.

17. The composition of claim 15 wherein said polyalkylene polyether polyol is at least one of a propylene oxide-trimethylolpropane triol or a propylene oxide-propylene glycol diol.

18. A foamable and curable mixture consisting of two components, A and B, utilized in the preparation of a polyurethane foam wherein component A consists of an organic compound containing at least two active hydrogen-containing groups as determined by the Zerewitinoff method and a co-catalyst mixture of at least one organo-mercuric compound, and at least one zinc salt of an alkyl carboxylic acid having about 2 to about 22 carbon atoms and wherein component B consists of an organic polyisocyanate wherein the organo-mercuric compound is selected from the group consisting of (1) the divalent mono-mercury salts of organic acids and (2) the ionizable mono-organo-mono-mercuric carboxylates or polycarboxylates containing only one carbon to mercury bond which are inert to isocyanate-active hydrogen reactions.

19. The composition of claim 18 wherein said organo mercuric compound is a mercuric alkyl carboxylate and said zinc salt is selected from the group consisting of zinc naphthenate, tallate, neodecanoate, and mixtures thereof.

20. The composition of claim 19 wherein said mercuric alkyl carboxylate is a phenylmercuric salt of an alkyl carboxylic acid.

21. The composition of claim 20 wherein said phenyl mercuric salt is a salt of an alkyl carboxylic acid having a chain length of about 2 to about 22 carbon atoms.

22. The composition of claim 21 wherein said phenylmercuric salt and said zinc salt are present in amounts to contribute about 0.005 part by weight to about 0.5 part by weight of zinc cation per 100 parts of said organic compound containing at least two active hydrogen-containing groups and wherein said phenylmercuric salt of a carboxylic acid is present in a weight ratio of about 10:1 to about 1:2 of mercury cation to zinc cation respectively.

* * * * *